April 22, 1952  W. E. WUNDERLICH  2,593,953
DOUBLE NOSE COIL SPRING
Filed Sept. 30, 1949
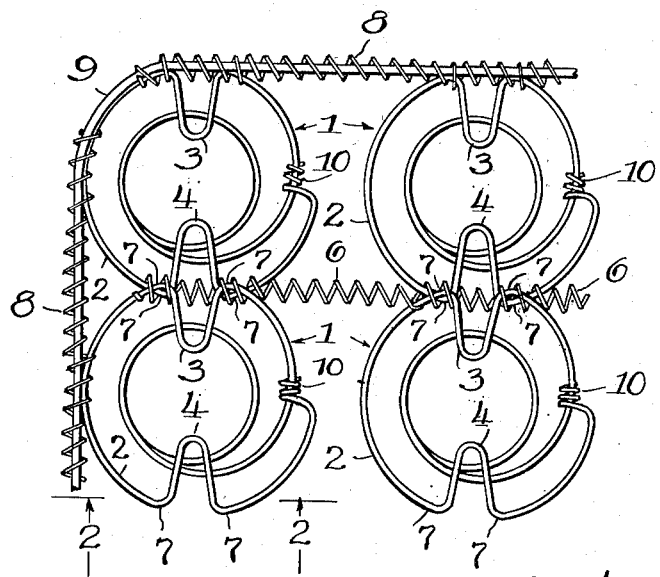
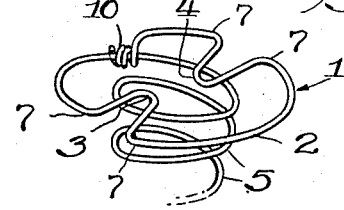
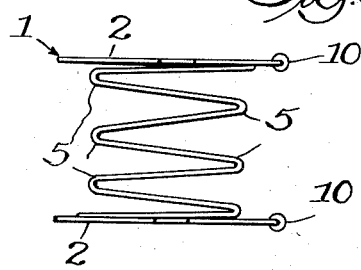
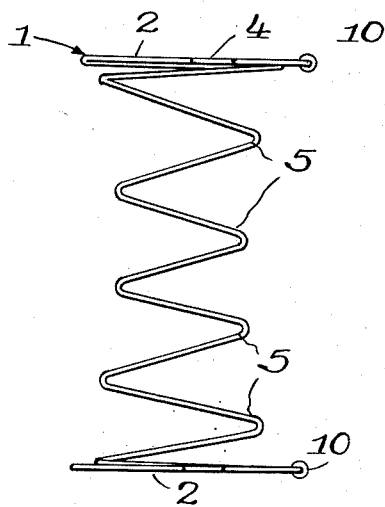
Inventor,
William E. Wunderlich
by Ira J. Wilhow Atty.

Patented Apr. 22, 1952

2,593,953

UNITED STATES PATENT OFFICE 2,593,953

DOUBLE NOSE COIL SPRING

William E. Wunderlich, Muncie, Ind., assignor to Burton-Dixie Corporation, Chicago, Ill., a corporation of Delaware Application September 30, 1949, Serial No. 118,755

4 Claims. (Cl. 5—248)

The present invention relates to a novel spring construction of the tapered type and to a novel spring assembly adapted to be employed in innerspring mattresses, bedsprings, cushions and the like.

In springs of the usual tapered coil type having end convolutions of substantially greater diameter than the intermediate windings, it is found that the underlying or intermediate coils or convolutions, when the spring is compressed under load, protrude through and beyond the plane of the larger end convolutions and cause excessive wear by contact with the covering overlying the end convolutions, and also cause damage to the filling material where such a spring is employed in a cushion, mattress or the like.

It is, therefore, an object of the present invention to provide a novel cushion spring of tapered form having its larger top and bottom convolutions or windings each provided with spaced and inwardly extending projections or indentations adapted to contain and prevent the intermediate and smaller convolutions from protruding or projecting therethrough whenever the spring is compressed under load. By means of the novel spaced or opposed arrangement of inwardly extending projections or indentations, the smaller intermediate windings are effectively prevented from protruding beyond the plane of the upper and lower end convolutions of each spring.

The present invention further comprehends a novel spring cushion having inwardly and substantially radially projecting extensions or indentations formed in the top and bottom convolutions of each spring, and with the adjacent springs arranged and pivotally connected by helical members in such manner as to provide for a free hinge action and resilient connection therebetween.

Further objects of the invention are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a fragmentary top plan view of one corner of the novel spring assembly, and showing the manner of forming the springs and joining them together in the final assembly.

Figure 2 is a view in front or side elevation of the novel spring expanded to the position it occupies when under no load.

Figure 3 is a view similar to Figure 2 but with spring compressed under load.

Figure 4 is a fragmentary view in perspective of one end of the novel spring.

Referring more particularly to the disclosure in the drawing and to the novel illustrative embodiment therein shown, the present invention comprehends the provision of a novel spring unit 1, a plurality of which are shown assembled in Fig. 1 to form a spring cushion assembly in which the spring cushion may be composed of any desired number and size of spring units 1 joined together in such manner as to form an ultimate assembly having the desired over-all dimensions suitable for forming a cushion, innerspring mattress, bedspring and the like of predetermined size. Each spring or unit 1 is of the so-called tapered form having relatively large end or terminal convolutions or windings 2 and each end convolution bent or formed to provide a pair of projections or indentations 3 and 4 extending radially inwardly and of such length as to assure engagement thereof by the smaller and intermediate windings or convolutions 5 when the spring is compressed under load to such an extent that these inner windings are forced into contact with the end convolutions 2.

By providing the present novel arrangement and spacing of the projections or indentations 3 and 4, movement of the inner spirals or windings 5 relative to the end convolutions is thereby controlled and the former, regardless of the load imposed on the spring, are limited in their axial movement by engagement with these indentations. I am aware that the Contino Patent No. 2,182,069 of December 5, 1939, proposes to provide the outer winding with a single extension but the use of such an extension does not prevent the inner windings or spirals opposite to and away from the extension from tilting or cocking upwardly and outwardly and projecting through and beyond the larger end convolutions. By the present invention the spaced or opposed projections or indentations are so formed and placed as to provide a pair of stops or barriers which are engaged by the windings or spirals 5 at both sides of the spring and thereby provide a uniform and balanced action which eliminates any danger of the windings or spirals 5 protruding through the top and bottom terminal windings or convolutions 2, 2.

By providing the projections or indentations 3 and 4 in the disclosed spaced relation, the present spring units 1 further lend themselves most effectively to an assembly in which the adjacent springs are joined or connected by a cross helical or continuous wire coil of spring wire 6, spun or wound about and tying together the adjacent or abutting arcuate surfaces 7 on the end convolutions 2 adjoining the substantially V-shaped projections or indentations 3 and 4. Thus by winding or interlacing the cross helicals 6 between adjacent rows of springs 1 in the manner shown in Fig. 1, the adjoining springs are resiliently connected and a free hinge action or pivotal movement is effected between the adjacent or abutting arcuate surfaces 7. A wire helical or coil 8 similar to the coil 6 which ties together the adjacent rows of springs 1, is employed to tie the outer arcuate surfaces of the terminal windings or convolutions 2 of the outer rows of springs 1 to a wire frame 9 outlining the outer dimensions or periphery of the spring cushion assembly.

Each spring 1 is preferably formed of a continuous length of wire coiled into approximately tapered contour, with the opposite ends terminating in the outer or end convolutions 2, each provided with the spaced radially and inwardly extending projections or indentations 3 and 4 and with the extreme ends tightly wound about the end convolutions at 10 to securely anchor these ends in place.

Although I prefer to form and dispose the projections or indentations 3 and 4 of the end or top and bottom convolutions in the manner disclosed in the drawing in which they are in opposed and aligned relation, it will be understood that they may be somewhat staggered in their relationship so long as they give a uniform and balanced action in which the intermediate windings or coils are effectively prevented from tilting and protruding beyond the plane of the end convolutions.

Having thus disclosed the invention, I claim:

1. A tapered coil spring having end convolutions and intermediate windings with the latter of substantially smaller diameter than the end convolutions, each of said end convolutions having spaced, radially and inwardly projecting indentations substantially diametrically aligned and of such length as to project radially inwardly of the smallest of the intermediate windings, whereby when the spring is compressed under load spaced surfaces on said intermediate windings contact said indentations and are prevented from projecting through and beyond the plane of the end convolutions and the load imposed on the coil springs is evenly distributed and balanced.

2. A tapered coil spring having end convolutions and intermediate windings of substantially less diameter than the end convolutions, said end convolutions each having oppositely disposed and substantially aligned inwardly extending projections of such length as to project inwardly of and above and below the smallest of the intermediate windings, whereby when the spring is compressed under sufficient load to cause the intermediate windings to project into the plane of the end convolutions, said intermediate windings impinge against the projections and are thereby held and prevented from protruding therebeyond and by reason of such impingement the imposed load is equally distributed to the opposite sides of the coil spring and balanced.

3. A coil spring having end coils and intermediate coils with the latter of substantially less diameter than the end coils and each end coil having substantially radially extending indentations uniformly spaced apart along the circumference of the end coils and projecting inwardly beyond the smallest of the intermediate coils whereby to form stops against which the intermediate coils impinge when under substantial compression, said uniformly spaced indentations being adapted to engage the intermediate coils at spaced points along their arcuate surfaces and thereby uniformly distribute the load to both sides of the coil spring and prevent these intermediate coils from tilting and protruding beyond the plane of the end coils.

4. In a coil spring assembly, a plurality of springs each having end coils and intermediate coils with the latter of substantially less diameter than the end coils, each end coil having integrally formed and diametrically aligned indentations projecting inwardly beyond the smallest of the intermediate coils whereby to form stops against which the opposite sides of the intermediate coils impinge when under substantial compression and upon such impingement the load is uniformly distributed to the opposite sides of the spring, and helical members resiliently connecting adjacent springs, said members being wound about the arcuate surface of the end coils only and across the indentations whereby to provide a free hinge action between adjacent springs.

WILLIAM E. WUNDERLICH.

REFERENCES CITED

The following references are of record in the file of this patent:

UNITED STATES PATENTS

| Number | Name | Date |
| --- | --- | --- |
| 110,174 | Velie | Dec. 13, 1870 |
| 261,774 | Singleton | July 25, 1882 |
| 271,554 | Walters | Jan. 30, 1883 |
| 1,172,943 | Millea | Feb. 22, 1916 |
| 2,182,069 | Contino | Dec. 5, 1939 |
| 2,260,627 | Krakauer | Oct. 28, 1941 |

FOREIGN PATENTS

| Number | Country | Date |
| --- | --- | --- |
| 388,803 | France | June 11, 1908 |